United States Patent
Rooijmans

(10) Patent No.: US 11,782,313 B2
(45) Date of Patent: Oct. 10, 2023

(54) BACKLIGHTING DEVICE FOR THE DISPLAY SCREEN OF A TELEVISION OR MOBILE PHONE

(71) Applicant: Gemex Consultancy B.V., Oss (NL)

(72) Inventor: Johannes Otto Rooijmans, Oss (NL)

(73) Assignee: Gemex Consultancy B.V., Oss (NL)

( * ) Notice: Subject to any disclaimer, the term of this patent is extended or adjusted under 35 U.S.C. 154(b) by 45 days.

(21) Appl. No.: 17/607,055

(22) PCT Filed: Apr. 30, 2019

(86) PCT No.: PCT/EP2019/061120
§ 371 (c)(1),
(2) Date: Oct. 28, 2021

(87) PCT Pub. No.: WO2020/221448
PCT Pub. Date: Nov. 5, 2020

(65) Prior Publication Data
US 2022/0155641 A1 May 19, 2022

(51) Int. Cl.
*G02F 1/13357* (2006.01)
*G02F 1/13363* (2006.01)
*G09G 3/36* (2006.01)

(52) U.S. Cl.
CPC .. *G02F 1/133609* (2013.01); *G02F 1/133603* (2013.01); *G02F 1/133606* (2013.01); *G02F 1/133637* (2021.01); *G09G 3/3607* (2013.01)

(58) Field of Classification Search
CPC ......... G02F 1/133514; G02F 1/133603; G02F 1/133606; G02F 1/133609; G02F 1/133624; G02F 1/133637; G09G 3/3607
See application file for complete search history.

(56) References Cited

U.S. PATENT DOCUMENTS 11,194,090 B2 * 12/2021 Asakawa .......... G02F 1/133514
2017/0139269 A1 5/2017 Asakawa

* cited by examiner

*Primary Examiner* — Ashok Patel
(74) *Attorney, Agent, or Firm* — N.V. Nederlandsch Octrooibureau

(57) ABSTRACT

Backlighting device for a screen for a television, mobile phone or the like, which includes
a first light source adapted to emit light having a peak wavelength between 600 and 630 nm;
a second light source adapted to emit light having a peak wavelength between 510 and 530 nm;
a third light source adapted to emit light having a peak wavelength between 440 and 460 nm; and the light emitted by one of the light sources has a bandwidth of less than 15 nm, preferably less than 10 nm, more preferably less than 5 nm.

15 Claims, 4 Drawing Sheets

BACKLIGHTING DEVICE FOR THE DISPLAY SCREEN OF A TELEVISION OR MOBILE PHONE

BACKGROUND OF THE INVENTION

1. Field of the Invention

The present invention relates to backlighting device for a screen for a television, mobile phone or the like. The invention also relates to a screen comprising such a backlighting device.

2. Description of the Related Art

Presently, screens and displays for televisions or the like are often made of LCDs (liquid crystal displays) which are backlit using LEDs (light-emitting diodes). The LEDs produce light with a certain spectral distribution which is guided through a plurality of which may be TFT (thin-film transistor) channels with a well-defined bandwidth selection profile, in order to provide coloured subpixels in red, green or blue. The screens are typically compliant with international standards such as BT 2020 or NTSC. Typically, an average of about 6% of the light produced behind the TFT channels is actually emitted from the front of the screen. This limits the luminous efficiency of the screen and forms a waste of energy.

At the same time, the perceived resolution of the screen is limited because of an overlap in the emission wavelengths that pass through the differently coloured TFT channels. This may cause the human eye to perceive multiple adjacent subpixels, which are intended to have different colours, as single subpixels. This may reduce the perceived resolution and deteriorates the visual acuity.

In light of the above, it would be desirable to provide solutions which at least partially overcome some of the inconveniences of the prior art.

SUMMARY OF THE INVENTION

According to the invention there is provided a backlighting device for a screen for a television, mobile phone or the like, wherein the backlighting device comprises:
- a first light source adapted to emit light having a peak wavelength between 600 and 630 nm;
- a second light source adapted to emit light having a peak wavelength between 510 and 530 nm;
- a third light source adapted to emit light having a peak wavelength between 440 and 460 nm; wherein the light emitted by each or one of the light sources, preferably at least the second light source, has a bandwidth of less than 15 nm, preferably less than 10 nm, more preferably less than 5 nm. For the present purpose, bandwidth is the spectral bandwidth in wavelength and defined as the full-width at half maximum (FWHM), as is common in the art and references to bandwidth are to be understood as being the FWHM bandwidth. The bandwidths referred to are measured at room temperature.

In the following, the spectral peak of the first light source may be referred to as the red peak, the spectral peak of the second light source may be referred to as the cyan peak, and the spectral peak of the third light source may be referred to as the blue peak.

The invention also relates to a screen for a television, mobile phone or the like comprising such a backlighting device.

The spectral power distribution emitted from the backlighting device (also referred to as lighting device) enhances visual acuity and colour sensation for viewers of the screen comprising the backlighting device, since the emission peaks of the different light sources are better segregated than in screens of the prior art. The specific spectral power distribution also increases perceived resolution since the individual pixels can be better distinguished by a human eye. Due to the spectral distribution which is suited to the spectrally shifting sensitivity of a human eye, the perceived brightness is also increased. This means that lower lighting powers are sufficient to achieve the same perceived brightness, which leads to energy savings.

The concept of improved visual acuity using a modified spectral power distribution has been discussed in WO 2015/034350 by the same applicant, which is incorporated herein by reference in its entirety.

The spectral power distribution of the lighting device is different from spectra defined in common standards for screens and displays such as BT 2020 (rec. 2020) or NTSC, which require filters centred around 460, 535 and 625 nm. In fact, the present standards do not correspond with the spectral power distribution that is most suited to the human eye. As a result, not only the lighting device within the screen but also other optical equipment in the screen is usually adapted to the standards and thus partially incompatible with the lighting device as described above.

The spectral power distribution emitted by the lighting device as described herein is adapted to the human eye. In particular, the eye's sensitivity to colour differences is low at around a wavelength of 555 nm. Emitted light around this wavelength is therefore difficult to distinguish from light with a slightly different wavelength, which leads to a reduced colour contrast and therefore lower visual acuity. In other words, light emitted around this wavelength does not effectively contribute to the perceived acuity. The probability that a pixel emitting light around this wavelength can be distinguished from the surrounding pixels is relatively small since it requires a large spectral difference in order to be distinguished. Therefore, a large peak around 555 nm is detrimental for the perceived resolution of the screen. In the invention, light around this wavelength is therefore omitted as much as reasonably possible and instead a cyan peak between 510 and 530 nm is introduced by the second light source and the amplitude of the red peak is increased. This has been explained in terms of Cone Sensitivity Difference (CSD) in a scientific article in OSA Optics Express 23(11): A741-51 (2015) by Jiang et al., which is incorporated herein by reference in its entirety. The cyan and red peaks will account for a better visual acuity and perceived resolution compared to a spectrum having a peak around 555 nm. The perceived colourfulness or colour sensation is also increased: a viewer will be able to distinguish colours better and will perceive the colours as more intense. At the same time, the S/P ratio is increased since the fraction of scotopic light (centred around 505 nm) is increased relative to the fraction of photopic light (centred around 555 nm).

Preferably, the blue peak of the third light source is limited in intensity, preferably less than 200% of the maximum of either of the peaks of the first and second light sources. Too much blue light may damage the retina of the eye and disturb the circadian rhythm by increased melatonin suppression. Also, chromatic aberration of blue light in the human eye may distort the visual acuity. Preferably, no yellow filter is needed to limit the strength of the blue emission peak.

The bandwidths of the peaks is narrow, which ensures a very limited or no overlap between the different peaks. The bandwidth is less than 15 nm for at least one of the light sources. Preferably, the bandwidth is less than 14, 13, 12, 11, 10, 9, 8, 7, 6, or 5 nm, or between 3 and 15 nm, preferably between 3 and 10 nm.

Preferably, the peaks are spectrally symmetric, i.e. the intensity reduces with the same slope in both spectral directions from the peak. As a result, the dominant wavelength (which represents the colour observed by the brain of a viewer) corresponds to the actual peak wavelengths.

The lighting device preferably comprises no light source with spectral characteristics other than the first, second and third light sources as recited in claim 1. However, the lighting device may comprise a plurality of clusters comprising each of the three light sources. The lighting device may comprise an array, which is a regular repetition of the three light sources or of the clusters. The array is preferably rectangular but may also be a different array, such as a triangular array. The smallest repeated grouping in the array is the cluster of light sources; each cluster may comprise a first, a second and a third light source, or at least one of each of the three light sources. Preferably, each cluster comprises only light sources of the first, second and third types and no light source having a different spectral characteristics. The screen may be provided with an array of at least 40 clusters, preferably at least 80, more preferably at least 120.

In an embodiment, the screen further comprises spectral filters corresponding to the peak wavelengths of the first, second and third light sources, wherein each filter is configured to transmit substantially no light coming from light sources other than the light source to which it corresponds.

The light sources as described herein are beneficial in lighting devices with band pass filters, as compared to the case with conventional light sources. They reduce the amount of light that would otherwise be blocked by the filters and also reduce leakage of light through the filters, for example at the edges of the filters.

When the peaks are better segregated, it is much easier to filter out two of the three light sources, without contamination from the other light sources. The limited bandwidth thus further increases the perceived resolution and visual acuity. Furthermore, if filters are used, the narrow bandwidths allow for higher efficacy, since a smaller fraction of the light emitted by the light sources falls outside the transmission range of (i.e. is blocked by) the filters.

In an embodiment, the screen is an LCD screen, such as a TFT-LCD screen, comprising a screen plane for displaying an image, the screen comprising a pixel array with for each pixel three liquid crystals and three colour filters, such as TFTs, corresponding to the first, second and third light sources, and wherein the lighting device is configured to emit light towards the pixel array, and wherein the liquid crystals are aligned with the colour filters so as to determine the transmission of light from the lighting device towards the front plane; preferably wherein the screen further comprises a processing device for converting a digital image to a collection of desired pixel colours, and a controller for controlling the transmission of the liquid crystals, wherein the processing device is configured to communicate the collection of desired pixel colours to the controller, and wherein the controller is configured to adapt the transmission of the liquid crystals in each pixel to transmit light through a subset of the colour filters, such that each pixel emits a desired colour according to the collection of desired pixel colours.

The light sources may be LEDs and/or VCSELs which are preferably installed in an array behind the screen or along the edges of the screen.

The filters define coloured subpixels and are aligned to liquid crystals which are adapted to control the light intensity of the lighting device per coloured subpixel based on the image that is to be displayed. The screen may further comprise mutually perpendicular polarisers at both sides of the liquid crystals.

The screen preferably includes a diffuser for scattering the light emitted by the backlighting device, to increase the uniformness of directional and spatial distribution of the light, wherein the diffuser is placed between the backlighting device and the liquid crystals. The diffuser has the function to mix light from all light sources such that no coloured spots can be seen on the screen.

Preferably, the resolution of the screen is at least 1080p (Full HD), at least 2K or at least ultra-high definition (4K or 8K). It will be understood that the number of pixels may be higher than the number of individual clusters of light sources. In an embodiment, the number of pixels may be at least 1000 times greater than the number of clusters, preferably at least 10000 times.

Materials used for the LEDs or VCSELs may for instance be GaAs or AlInGaP or AlGaAs for the first light source, InGaN or GaP for the second light source, and/or InGaN or GaN for the third light source, but also other materials known in the art may be used. The person skilled in the art will understand that the spectral distribution of the LEDs or VCSELs can be modified to the desired emission wavelengths. In order to limit the bandwidth of the light sources, they may be equipped with narrow band pass filters centred around the peak wavelength. These narrow filters are distinguished from any filters associated with the coloured pixels, since these narrow filters are associated with the light sources itself (so the number is equal to the number of light sources) and filter virtually all the light leaving the light source. The filters associated with the pixels are usually aligned with a liquid crystal. Alternatively, the light sources may be equipped with quantum dots (QDs) or quantum wells (QWs) which also allow for narrow peaks.

Wherever the application mentions 'screen', alternative concepts such as 'display', 'interface', 'monitor' and equivalents are intended to be included. The screens may be intended for televisions, mobile phones, notebooks, laptops, personal computers, tablets, vehicle interiors, watches, utility appliances, digital billboards, smartboards and other equipment.

In an embodiment, at least one of the light sources is a vertical cavity surface emitting laser light source (or, in short, VCSEL light source or VCSEL). A VCSEL is a very thin disk-shaped laser fabricated on a wafer, with light emitted by the top surface. Commercial electrically pumped VCSELs can be made inexpensively and have a naturally round beam. VCSELs can be fabricated in arrays that emit very high powers.

In an embodiment, the third light source is a LED light source and the second light source is a VCSEL light source, and preferably the first light source is a VCSEL light source. In particular, only the second light source may be a VCSEL light source. Alternatively, the first light source and the second light source may be VCSEL light sources, while the third light source is a LED light source. Alternatively, all three light sources are VSCEL light sources.

Generally, the screen and backlighting device as described herein are suitable for LiFi communication. LEDs or VCSELs allow for high transmission rates and fast switching which is desired. In particular, VCSELs typically have a high cut off frequency, which facilitates high speed when the lighting device is used for LiFi communication.

For the third light source (blue) a conventional LED may be used as blue LEDs have high efficiencies and are economically viable. In that case, a hybrid LED-VCSEL backlighting device may be formed which provides a combination of LEDs and VCSEL light sources. In combination, they produce the desired narrow emission peaks at high efficiencies.

For the second light source (which is cyan), VCSELs are very useful since LEDs that meet the wavelength and efficiency requirements are more challenging to produce in an economical way. Possibly, the second light source may be a VCSEL of a shorter wavelength including a phosphor coating or layer, such that the phosphor emits light that meets the spectral requirements (and the VCSEL light exciting the phosphor is blocked). It will be understood that apart from the fact that existing cyan LEDs have a relatively broad spectrum, the fact that this occupies the central frequency means that it potentially interferes with both of the other peaks from the first and third lighting sources. It also contributes to the spectral power at 555 nm, which is to be avoided. Choosing to replace the cyan LED with a narrow bandwidth VCSEL is thus a very cost effective improvement over existing lighting devices.

In an embodiment, the lighting device provides a spectral power distribution with a spectral power at 555 nm which is less than 50%, preferably less than 20%, more preferably less than 10% of the spectral power at the peak wavelength of the first light source. Light emitted at 555 nm does not effectively contribute to visual acuity so suppressing the power at this wavelength increases overall visual efficiency.

In an embodiment, the lighting device is adapted to emit light in a spectral power distribution with an S/P ratio of between 2 and 5. These S/P ratios ensure an improved perceived intensity compared to (the conventional) lower S/P ratios.

In an embodiment, the CCT (correlated colour temperature) of the spectral power distribution is between 6000 and 7000 K, preferably around 6500 K. These CCTs correspond to natural daylight.

In an embodiment, the lighting device has a spectral power distribution with a maximum spectral power, and the spectral power in the range between 470 and 490 nm is less than 15% of the maximum spectral power, preferably with a minimum spectral power of less than 5% of the maximum spectral power; and/or the spectral power in the range between 550 and 590 nm is less than 15% of the maximum spectral power, preferably with a minimum spectral power of less than 10% of the maximum spectral power. Such a spectral power distribution allows for a better perceived acuity because of better segregated peaks.

BRIEF DESCRIPTION OF THE DRAWINGS

The features and advantages of the invention will be further appreciated upon reference to the following schematic drawings of a number of exemplary embodiments, in which corresponding reference symbols indicate corresponding parts.

The figures are for illustrative purposes only, and do not serve as a restriction on the scope or the protection as laid down by the claims.

DESCRIPTION OF ILLUSTRATIVE EMBODIMENTS

Figure 1A:
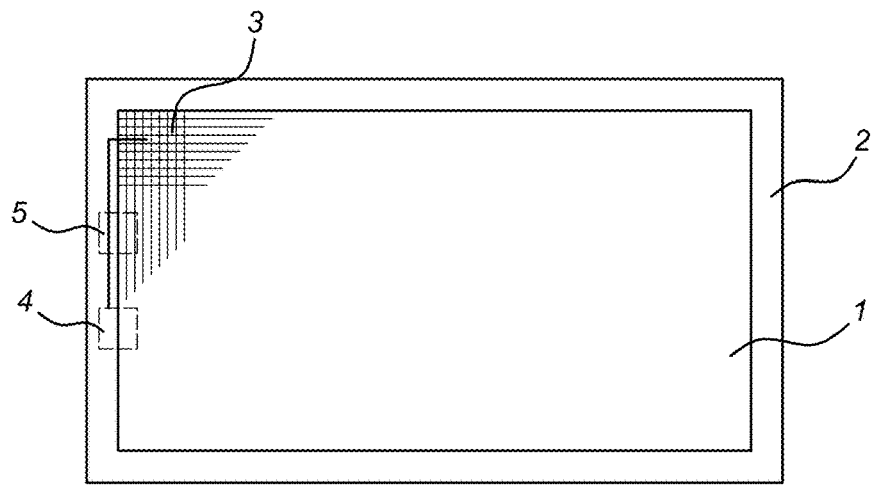
FIG. 1A schematically shows a front view of a television screen according to an embodiment.

FIG. 1A schematically shows a front view of an LCD television screen 1 according to an embodiment, placed in a casing 2 in which the screen 1 is mounted. The screen includes a pixel array 3 (only partly shown) built up of an array of pixels of which the colour can be set individually. In order to show an image on the screen 1, a digital image (delivered by for instance a network server, a digital memory or a computer) is converted by a processing device 4 to a collection of colours corresponding to the pixels in the pixel array 3. The processed image is communicated to a controller 5 which controls the individual colours of each pixel in the pixel array 3. Processing device 4 and controller 5 are preferably incorporated in the casing 2 of the screen 1 itself, for instance at the back side of the screen. Alternatively, they are separate from the screen 1 but are able to communicate with the relevant parts of the screen 1, in particular the pixel array 3 or specifically the liquid crystals.

Figure 1B:
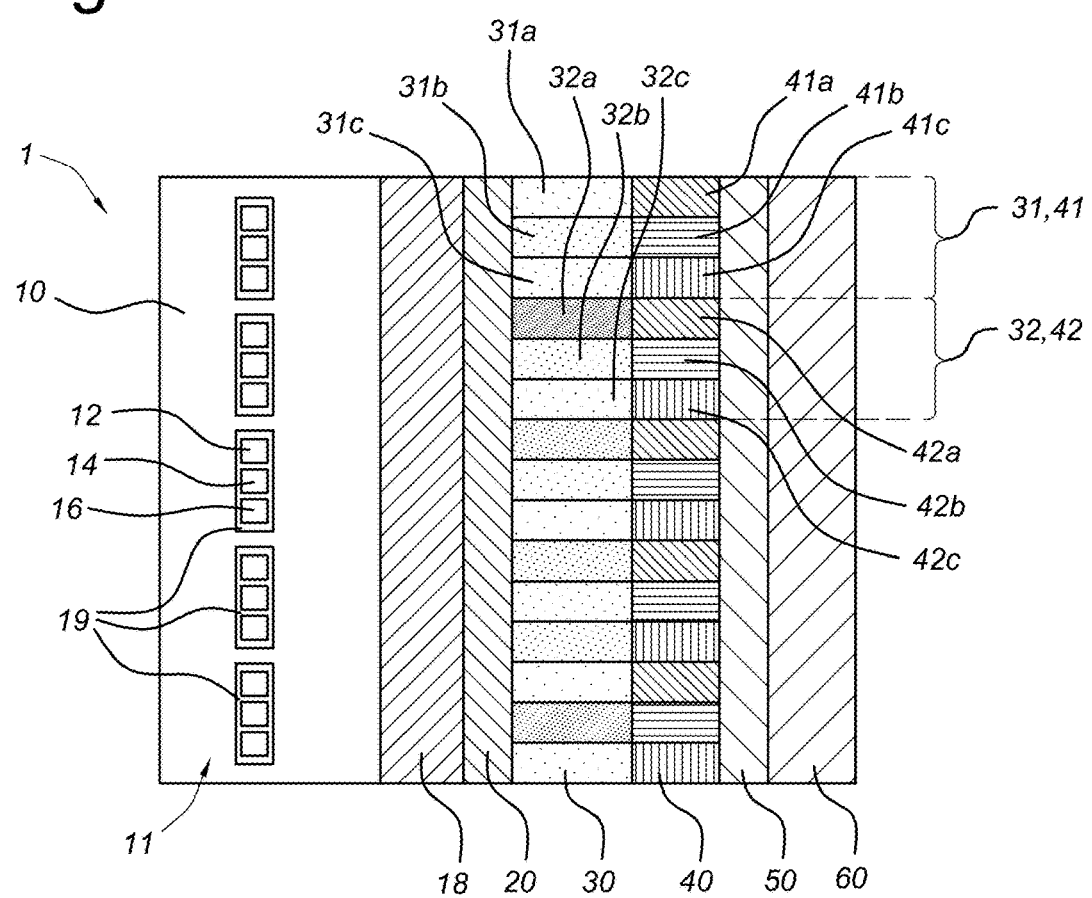
FIG. 1B schematically shows a cross-section of part of a television screen according to an embodiment.

FIG. 1B schematically shows a cross-section of a part of the LCD television screen. The figure shows a cross-section of a part of a screen 1, excluding the casing in which the screen is mounted. At the back side, the screen 1 comprises a backlighting device 10 including an array 11 of clusters 19 which each comprise a first light source 12, a second light source 14 and a third light source 16. The light emitted from the lighting device passes through a diffuser 18 towards the liquid crystals 30. The diffuser ensures that the light from the various light sources is mixed, such that the colours are spatially and directionally uniformly distributed over the screen. The liquid crystals 30 and filters 40 are divided by subpixel 31a, 31b, 31c, 32a, 32b, 32c, 41a, 41b, 41c, 42a, 42b, 42c so as to be able to vary the colours by controlling the transmission through each filter 40 by means of its corresponding liquid crystal 30. Three subpixels of the three different colours form a pixel 31, 41 in the pixel array. The liquid crystals 30 and filters 40 are sandwiched in between mutually perpendicular polarisers 20, 50. At the front side, a transparent cover layer 60 limits the screen 1. The person skilled in the art will understand that many variations to the screen's components and layers can be conceived which are compatible with the invention. In the illustrated case, the three types of light sources 12, 14, 16 in the lighting device 10 are mounted in clusters 19 in an array 11 behind the liquid crystals 30. Alternatively, the clusters 19 may be placed only at the edges of the screen 1, emitting into a waveguide which corresponds to the entire screen surface. In another alternative embodiment, the light sources may not be clustered. The working of exemplary backlit LCD screens has been explained in more detail for instance in U.S. Pat. No. 6,243,068, which is incorporated herein by reference in its entirety.

Figure 2:
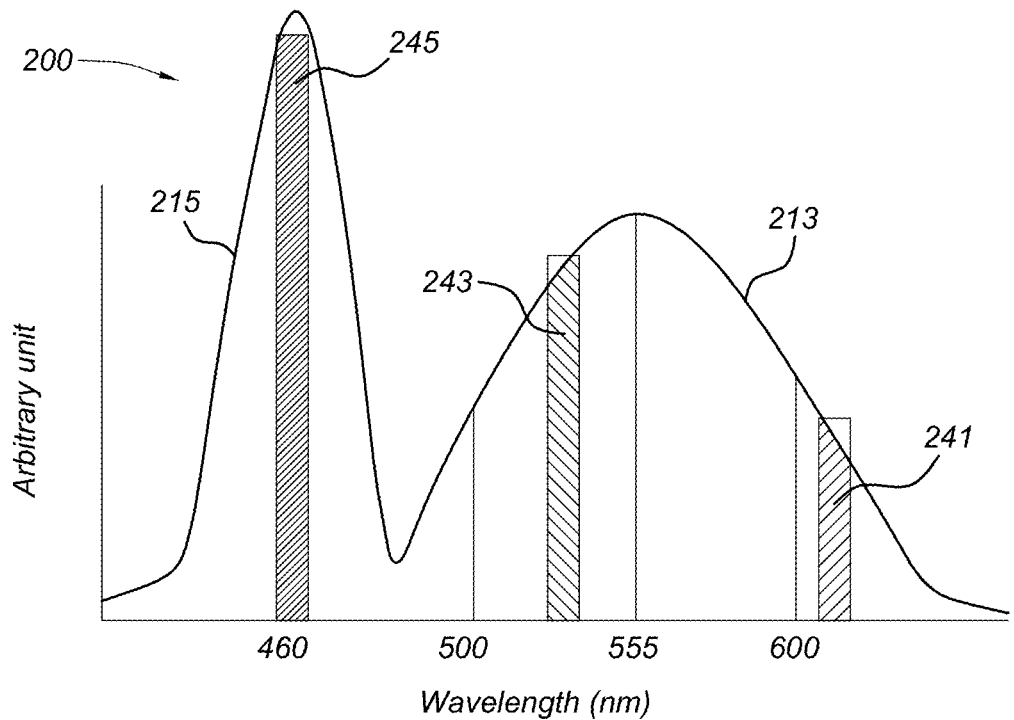
FIG. 2 schematically shows a spectral distribution of a lighting device according to the prior art.

FIG. 2 schematically shows a spectral distribution 200 of a lighting device according to the prior art. This spectrum is generated by a white, phosphor conversion (PC) LED. The blue peak 215 corresponds to the blue LED which excites the phosphor of which the phosphor emission peak 213 is centred around 555 nm. The blue peak 215 is weakened by means of a yellow filter, which leads to a loss of efficiency. It is clear from the spectrum that a large fraction of the light, in particular most of the broad phosphor emission peak 213, is generated far from the central transmission wavelengths of the filters 241, 243, 245 (indicated by the shaded rectangles). A large fraction of the light is blocked by the filters and/or does not contribute to the perceived resolution of a screen equipped with the lighting device.

Figure 3:
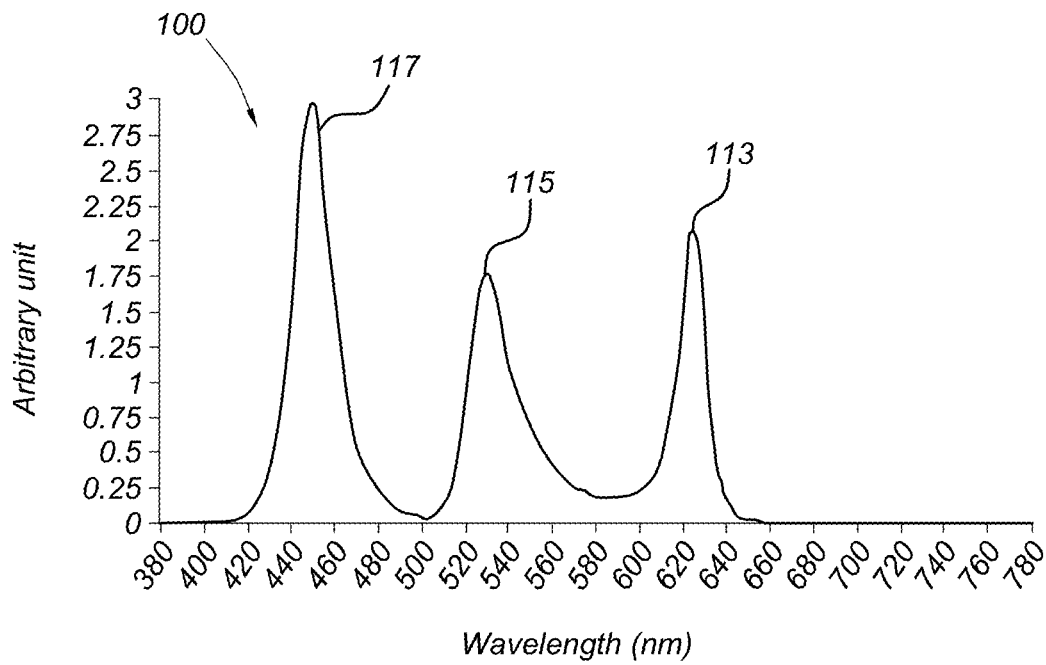
FIG. 3 schematically shows a spectral distribution of a screen or lighting device according to an embodiment of the invention.

FIG. 3 shows a spectral distribution 100 of a screen or lighting device according to an embodiment of the invention. The displayed spectral distribution 100 corresponds to the intrinsic emission from the lighting device. The peaks 113, 115, 117 of the first, second and third light sources each emit a narrow, substantially symmetric peak corresponding to the wavelengths of 625, 530 and 450 nm, respectively. In this case the light sources are LEDs. The narrow peaks 113, 115, 117 ensure that substantially all light can be used to form the coloured screen emission and hardly any light is to be filtered out. In particular the peak 113 of the first light source is narrow, with a FWHM of about 14 nm.

The illustrated spectral distribution 100 enables the screen to emit white light when desired, with a CCT (correlated colour temperature) of about 6500 K, corresponding to natural daylight.

Figure 4A:
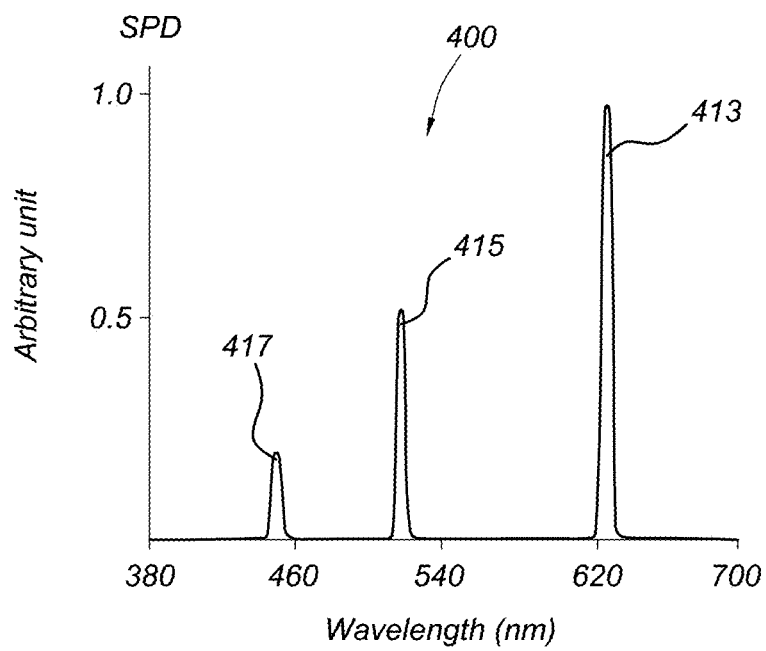
FIG. 4A schematically shows a spectral distribution of a screen or lighting device according to an embodiment of the invention.

FIG. 4A shows a spectral distribution 400 emitted by a screen or lighting device according to an alternative embodiment of the invention. The spectral distribution 400 comprises peaks 413, 415, 417, corresponding to first, second and third light sources, respectively. In this case, the light sources are VCSELs. The first light source emits a peak 413 around 625 nm, the second light source emits a peak 415 around 525 nm, and the third light source emits a peak 417 around 450 nm. The bandwidths (FWHM) of the three peaks are about 5 nm or less.

Figure 4B:
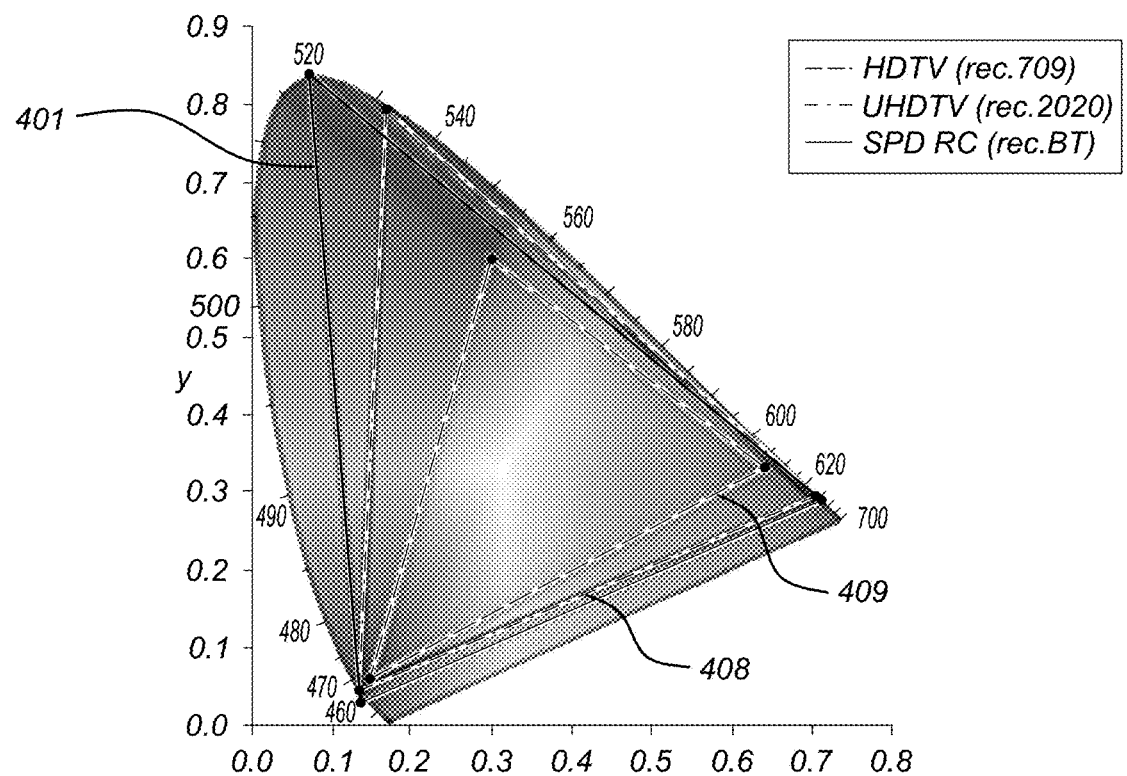
FIG. 4B schematically shows a colour space or gamut corresponding to the spectral distribution in FIG. 4A.

FIG. 4B shows a colour space or gamut 401 corresponding to the spectral distribution in FIG. 4A. It can be appreciated that the colour space 401 of the spectral distribution emitted by the claimed device (labelled SPD) is larger than the colour space 409 according to the HDTV (rec. 709) standard or the colour space 408 according to the UHDTV (rec. 2020) standard, due to the wavelength of the second peak 415, which is shorter than the corresponding peak in the standards (about 535 nm). Therefore, more different colours can be generated with a lighting device emitting light with the SPD spectral distribution, compared to those emitting light according to the standards.

Figure 5:
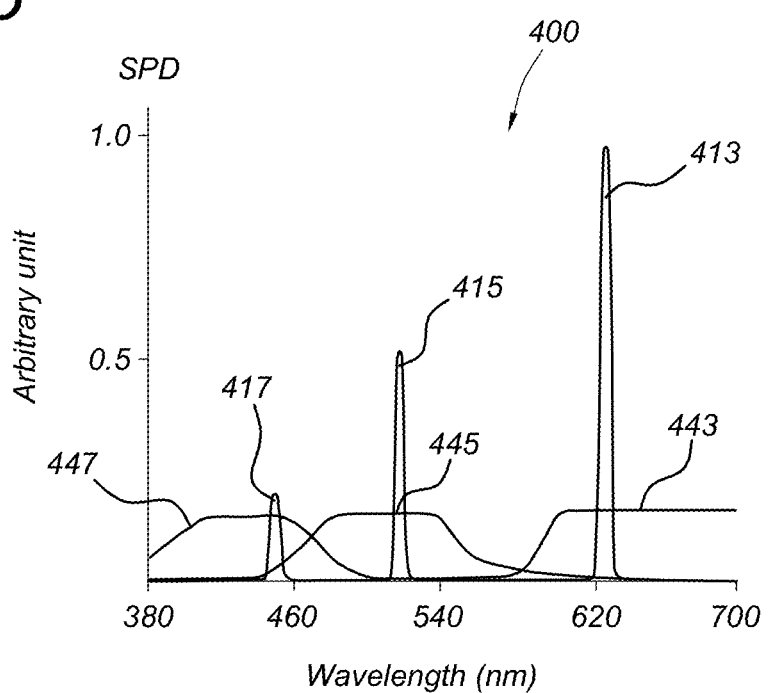
FIG. 5 again schematically shows the spectral distribution of FIG. 4A, together with exemplary filter characteristics.

FIG. 5 shows the spectral distribution 400 of FIG. 4A, with the characteristic transmission spectra 443, 445, 447 of the filters corresponding to the respective peaks 413, 415, 417. The transmission spectra 443, 445, 447 have very limited or substantially no overlap with the peaks 413, 415, 417 of the light sources and are distant from the 555 nm range.

The invention has been described by reference to certain embodiments discussed above. It will be recognized that these embodiments are susceptible to various modifications and alternative forms well known to those of skill in the art.

Many modifications in addition to those described above may be made to the structures and techniques described herein without departing from the spirit and scope of the invention. Accordingly, although specific embodiments have been described, these are examples only and are not limiting upon the scope of the invention.

The invention claimed is:

1. A backlighting device for a screen for a television, mobile phone or the like, wherein the backlighting device comprises a plurality of clusters of LED light sources, each cluster comprising:
    a first LED light source adapted to emit light having a peak wavelength between 600 and 630 nm;
    a second LED light source adapted to emit light having a peak wavelength between 510 and 530 nm;
    a third LED light source adapted to emit light having a peak wavelength between 440 and 460 nm;
    wherein the light emitted by at least the second LED light source has a bandwidth of less than 10 nm and an intensity of the peak wavelength of the third LED light source is less than 200% of the maximum of either of the peaks of the first or second LED light sources.

2. The backlighting device according to claim 1, wherein light emitted by the second LED light source has a bandwidth of less than 5 nm.

3. The backlighting device according to claim 1, wherein the light emitted by each of the LED light sources has a bandwidth of less than 10 nm.

4. The backlighting device according to claim 1, wherein the light emitted by the LED light sources forms peaks which are spectrally symmetric.

5. The backlighting device according to claim 1, wherein the backlighting device provides a spectral power distribution with a spectral power at 555 nm which is less than 50% of the spectral power at the peak wavelength of the first LED light source.

6. The backlighting device according to claim 1, wherein the three LED light sources are positioned in a rectangular array.

7. The backlighting device according to claim 1, wherein the backlighting device is adapted to emit light in a spectral power distribution with an S/P ratio of between 2 and 5.

8. The backlighting device according to claim 1, wherein the CCT of the spectral power distribution is between 6000 and 7000 K.

9. The backlighting device according to claim 1, wherein the backlighting device has a spectral power distribution with a maximum spectral power and the spectral power in the range between 470 and 490 nm is less than 15% of the maximum spectral power.

10. The backlighting device according to claim 1, wherein the backlighting device has a spectral power distribution with a maximum spectral power and the spectral power in the range between 550 and 590 nm is less than 15% of the maximum spectral power.

11. A screen for a television, mobile phone or the like, comprising the backlighting device according to claim 1.

12. The screen according to claim 11, wherein the screen is an LCD screen comprising a screen plane for displaying an image, the screen comprising a pixel array comprising pixels and each pixel, comprises three liquid crystal elements and three colour filters, corresponding to the first, second and third LED light sources, and wherein the backlighting device is configured to emit light towards the pixel array, and wherein the liquid crystal elements are aligned with the colour filters so as to determine the transmission of light from the backlighting device towards the front plane.

13. The screen according to claim 12, wherein the screen further comprises a processing device for converting a digital image to a collection of desired pixel colours, and a controller for controlling the transmission of the liquid crystal elements, wherein the processing device is configured to communicate the collection of desired pixel colours to the controller, and wherein the controller is configured to adapt the transmission of the liquid crystal elements in each pixel to transmit light through a subset of the colour filters, such that each pixel emits a desired colour according to the collection of desired pixel colours.

14. The screen according to claim 12, wherein each filter is configured to transmit substantially no light coming from LED light sources other than the LED light source it corresponds to.

15. The screen according to claim 12, wherein the screen further comprises a diffuser for scattering the light emitted by the backlighting device, to increase the uniformness of directional and spatial distribution of the light, wherein the diffuser is placed between the backlighting device and the liquid crystal elements.

* * * * *